United States Patent Office 2,817,182
Patented Dec. 24, 1957

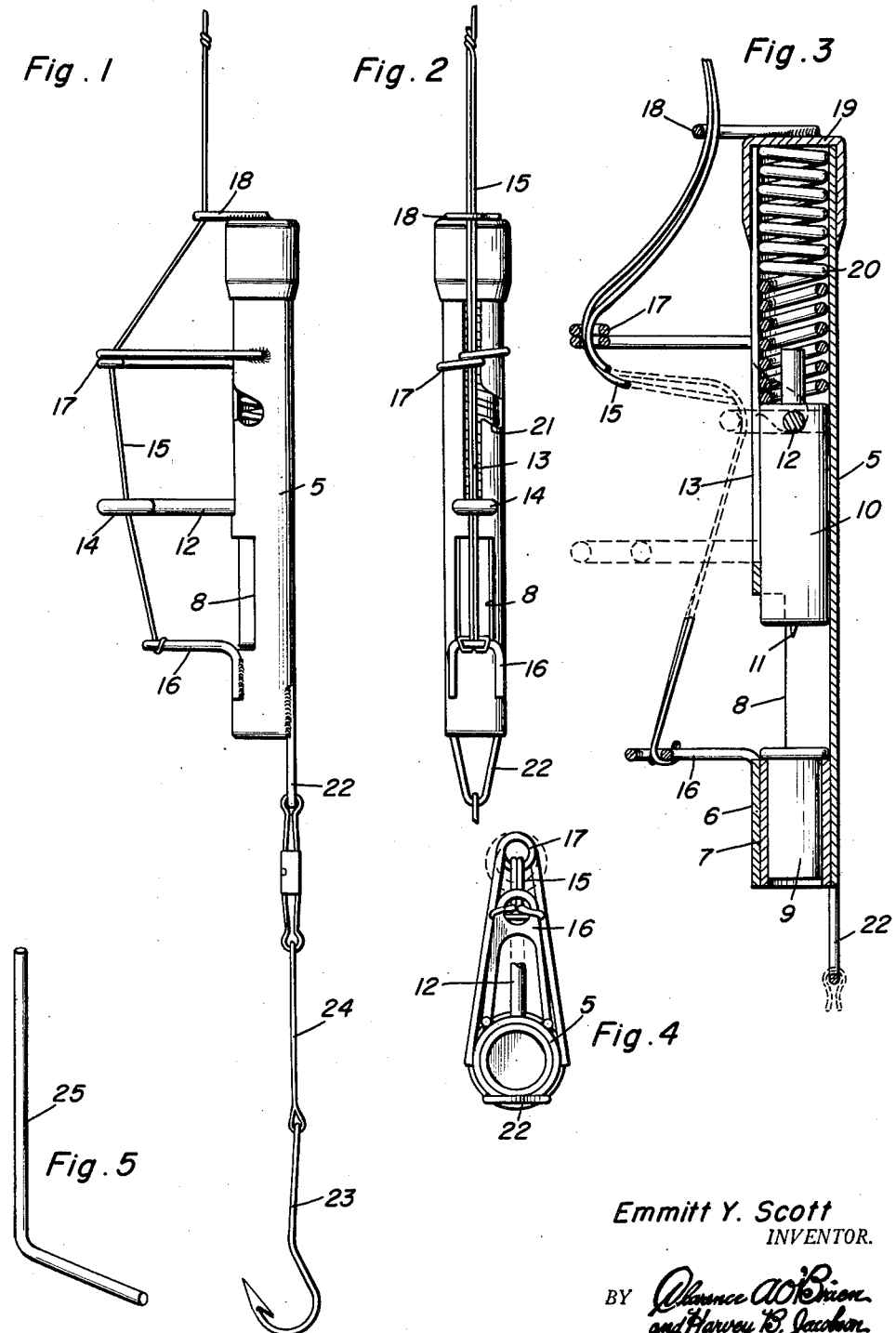

2,817,182
FISHING DEVICE

Emmitt Y. Scott, Swainsboro, Ga., assignor of twenty-five percent to E. H. Youngblood, Swainsboro, Ga.

Application October 31, 1955, Serial No. 543,776

2 Claims. (Cl. 43—84)

The present invention relates to new and useful improvements in devices for catching fish and more particularly to means for firing an explosive charge in the direction of the fish while the latter is held captive by the fishing device.

An important object of the invention is to provide a fishing mechanism including a fishhook connected to a cartridge holding firing device functioning to stun and to subdue the fish after the same has been caught on the hook.

Another object of the invention is to provide a barrel to the front end of which a fishhook is attached and a spring loaded hammer slidable in the barrel to strike and fire a cartridge placed in a chamber at the front end of the barrel.

Another object is to connect the hammer to a fish line for releasing the hammer upon a predetermined pulling force subjected to the line.

A still further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view;

Figure 2 is a front elevational view;

Figure 3 is an enlarged longitudinal sectional view showing the hammer in firing position;

Figure 4 is an end elevational view of the front end of the barrel; and

Figure 5 is a perspective view of a ramrod-type tool for pushing out the empty shell and forcing the spring biased plunger to a position in which it is cocked and readied for firing.

Referring now to the drawing in detail wherein for the purpose of illustration I have disclosed a preferred embodiment of the invention, the numeral 5 designates a barrel having a cartridge chamber 6 at its front end and which is preferably provided with a steel reinforcing lining 7. A loading opening 8 is formed in the front of the barrel behind the chamber 6 for placing a cartridge 9 in the chamber.

A hammer 10 is slidable in the rear portion of the barrel and is provided with a firing pin 11 at its front end for striking and firing the cartridge.

A pin 12 is suitably secured to the rear portion of hammer 10 and projects outwardly through a longitudinal slot 13 in the barrel. The outer end of the pin is formed with an eye 14 to freely receive a fishing line 15 which extends longitudinally with respect to the barrel and with the end of the fishing line attached to a bracket 16 which projects laterally outwardly from the chamber 6. The fishing line extends upwardly or rearwardly with respect to the barrel through a guide 17 which projects outwardly from the barrel adjacent the rear end thereof and the fishing line also extends upwardly or rearwardly through a rear guide 18 attached to the upper closed end 19 of the barrel.

A coil spring 20 is placed in the upper end of the barrel behind the hammer 10 to project the hammer in a firing movement.

The rear portion of longitudinal slot 13 is formed with a lateral and downwardly inclined locking notch 21 in which the pin 12 is adapted to enter to lock the hammer 10 in a retracted position against the tension of spring 20.

An eye 22 is suitably attached to the front or lower end of chamber 6 to project downwardly therefrom out of the path of the charge fired by the cartridge 9 and a fishhook 23 is attached to the eye 22 by a leader 24.

In Figure 5 of the drawing, I have illustrated a tool 25 of a type adapted to engage the eye 14 to retract the hammer 10 and to swing the pin 12 into the locking notch 21 whereby to set the hammer in its firing position. With the fishing line 15 passing through the eye 14 and also engaged in the guides 17 and 18 and with the lower end of the line attached to the bracket 16 and upon a fish being caught on the hook 23, a predetermined pulling force subjected to the line 15 will slide the pin 12 out of the notch 21 whereupon the hammer 10 will be released to strike the cartridge 9 and fire the same in the direction of the fish to stun or subdue the fish.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for use in stunning and thus subduing a fish after it has been hooked comprising a barrel closed at its upper end and open at its lower end and provided in its front side and spaced upwardly from said lower end with an opening and further provided in the front between the closed upper end and opening with an elongated slot, that portion of the barrel below said opening constituting a receiver and holder for a cartridge which is both inserted and removed by way of said opening, a spring loaded hammer slidably mounted with the upper portion of said barrel in a position to fire said cartridge, a rigid pin disposed at right angles to said hammer and projecting outwardly therefrom through and beyond said slot and terminating in a line passing and pull actuated tripping eye, said barrel being provided at one side with a keeper notch in registration wtih said slot and which is adapted to releasably receive said pin in a manner to retain the pin and hammer in a cocked position, a rigid eye member attached to the lower end of said barrel, a conventional-type fishhook, and means connecting said fishhook to said last named eye.

2. The structure defined in claim 1 and in combination, a bracket fixed to the lower front portion of said barrel below said opening, and additional line guides registering with each other and said bracket and in approximate alignment with said slot, and a fishing line passing downwardly through said additional line guides, through the eye on said pin and having its lower end attached to said bracket.

References Cited in the file of this patent

UNITED STATES PATENTS

| | | |
|---|---|---|
| 760,274 | Thomas | May 17, 1904 |
| 1,343,066 | Thompson | June 8, 1920 |
| 1,443,676 | Bowler | Jan. 30, 1923 |
| 2,765,566 | Waddell | Oct. 6, 1956 |